Figure 1:
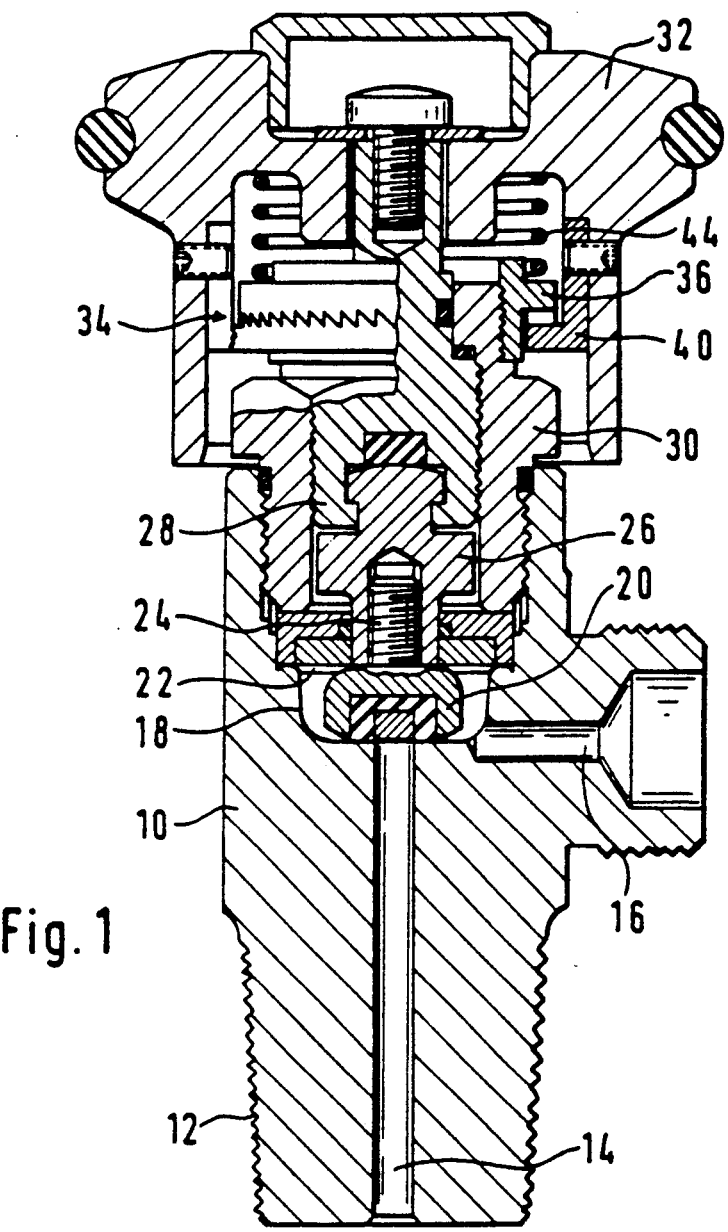

United States Patent [19]

Kerger et al.

[11] Patent Number: 5,037,066
[45] Date of Patent: Aug. 6, 1991

[54] VALVE FOR CYLINDERS OF COMPRESSED OR LIQUEFIED GAS

[75] Inventors: Leon Kerger, Helmdange; Paul Kremer, Walferdange, both of Luxembourg

[73] Assignee: Ceodeux S.A., Luxembourg, Luxembourg

[21] Appl. No.: 571,940

[22] Filed: Aug. 23, 1990

[30] Foreign Application Priority Data

Aug. 31, 1989 [LU] Luxembourg ............................ 87572

[51] Int. Cl.⁵ ........................ F16K 31/60; F16K 35/02
[52] U.S. Cl. ......................................... 251/230; 74/25; 74/548; 74/553; 74/575; 192/67 R; 192/95; 251/96; 251/229; 251/335.2
[58] Field of Search .................... 74/25, 111, 548, 552, 74/553, 554, 575; 192/67 R, 95; 251/95, 96, 100, 229, 230, 249.5, 335.2

[56] References Cited

U.S. PATENT DOCUMENTS

| | | | |
|---|---|---|---|
| 2,501,008 | 3/1950 | Schramm | 74/548 |
| 2,659,565 | 11/1953 | Johnson et al. | 251/332 |
| 2,780,333 | 2/1957 | Reiser et al. | 74/548 |
| 2,797,592 | 7/1957 | Marrapese | 74/548 |
| 2,829,538 | 4/1958 | Mueller | 192/67 R |
| 2,899,841 | 8/1959 | Melloy | 74/548 |
| 3,001,551 | 9/1961 | Wyser | 137/635 |
| 3,193,243 | 7/1965 | Billington et al. | 74/548 |
| 3,210,040 | 10/1965 | Thurlow | 74/548 |
| 4,402,340 | 9/1983 | Lockwood, Jr. | 251/335.2 |
| 4,549,716 | 10/1985 | Warren | 74/548 |

Primary Examiner—George L. Walton
Attorney, Agent, or Firm—Leydig, Voit & Mayer

[57] ABSTRACT

The valve comprises a rotating operating wheel (32) acting on a closing element (20) inside the body (10) of the valve. In order to enable the wheel (32) to be operated easily and at the same time to prevent accidental opening, the wheel (32) is connected to the closing element via a ratchet system (34) with sawteeth which are oriented so as to prevent the closing element (20) from opening without prior axial displacement of the wheel (32) counter to the action of a spring (44).

3 Claims, 1 Drawing Sheet

VALVE FOR CYLINDERS OF COMPRESSED OR LIQUEFIED GAS

The present invention relates to a valve for cylinder of compressed or liquefied gas, comprising a body containing a closing element at the intersection of a gas-inlet duct and a gas-outlet duct and which may be displaced axially via a cylinder under the action of a rotating operating wheel integral in rotation with the said cylinder.

For reasons of convenience, it is required of these valves, generally diaphragm valves, that they be easy to operate, in other words that the operating wheel may be turned easily. On the other hand, the consequence of a wheel which is easy to operate is that it may open on its own under the influence of jolts, for example when the cylinders are being transported. It is therefore very difficult to reconcile this requirement and its consequence.

The object of the present invention is to provide a valve which is easy to operate, and for which at the same time there is no risk of it opening on its own.

In order to achieve this objective, the present invention proposes a valve of the type described in the preamble, which is essentially characterized by a ratchet system consisting of two elements capable of mutual engagement via a sawtooth crown gear, one of the elements being fixed and integral with the body of the valve and the other integral with the operating wheel which may be displaced axially relative to the said cylinder counter to the action of elastic means in order to disengage the elements of the ratchet system from each other, and in that the sawteeth are oriented so as to prevent the closing element from opening without prior axial displacement of the wheel counter to the action of the said elastic means.

The two elements of the ratchet system are preferably two superposed rings with adjacent and complementary sawtooth crown gears.

The elastic means may consist of a helical spring bearing on the one hand against the fixed crown gear and on the other hand against the operating wheel and whose action tends to hold the crown gears interconnected.

In order to open the valve, it is therefore always necessary to press down the operating wheel counter to the action of the spring in order to deactivate the ratchet system and to be able to turn the wheel in the direction of the opening, which also means that there is no risk of the valve opening on its own since the spring holds the teeth of the ratchet system in mutual engagement and prevents any accidental rotation of the wheel.

On the other hand, although it is preferable to push down the wheel for the closing, this is not absolutely necessary since the orientation of the teeth of the ratchet system is such that the teeth may slide mutually over each other counter to the action of the spring.

Figure 2:
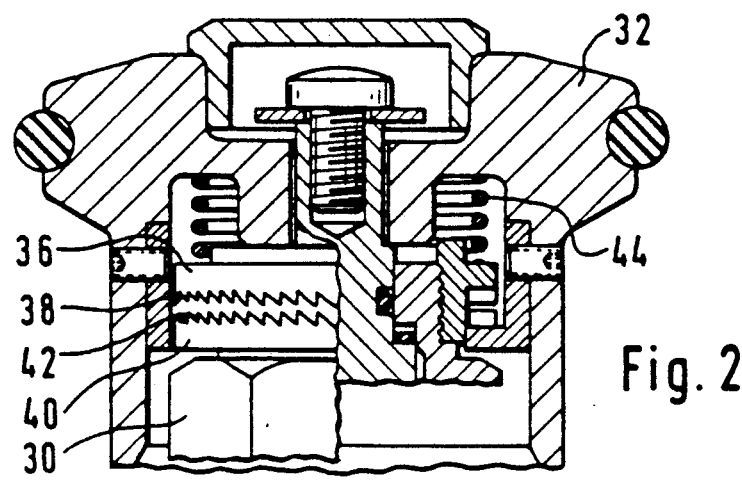

Other features and characteristics will emerge from the detailed description of an advantageous embodiment given hereinbelow with reference to the attached drawings, in which:

FIG. 1 shows a view of a spring according to the invention, partially in axial cross-section and partially in elevation of the ratchet system, and FIG. 2 shows the operating wheel in the position deactivating the ratchet system.

The valve shown in the figures has a body 10 whose lower part is provided with a thread 12 enabling the valve to be screwed onto a gas cylinder, not shown.

The body 10 of the valve has an axial inlet duct 14 and a radial outlet duct 16 at the intersection of which is situated a chamber 18 in which a closing element 20 is provided which may be displaced axially in order to open or to close tightly the axial duct 14.

The valve shown is a diaphragm valve, in other words the sealing-off from the outside is ensured by a flexible metal diaphragm 22 surrounding the stem 24 of the closing element 20. The stem 24 of the closing element is connected to a push rod 26 anchored in a cylinder 28 which is screwed into a sleeve 30 connected to the body of the valve. Rotation of the cylinder 28 consequently causes it to be displaced axially in the sleeve 30 and the closing element 20 hence to move correspondingly. The rotation of the cylinder 28 is generated by an operating wheel 32 which is integral in rotation with the cylinder.

According to the present invention, a ratchet system 34 is provided which prevents the rotation of the operating wheel 32 in the direction of opening when this wheel 32 is situated in the position in FIG. 1. This ratchet system 34 has an upper ring 36 integral with the sleeve 30 and provided on its lower face with a crown gear whose teeth 38 have a sawtooth shape, and with a lower ring 40 integral with the wheel 32 and provided on its upper face with a crown gear whose teeth 42, also in a sawtooth shape, complement the teeth 38 and are normally engaged in them, as shown in FIG. 1. The two rings 36 and 40 may be made in any manner whatsoever but preferably from synthetic materials. Although the wheel 32 is integral in rotation with the cylinder 28, it may nevertheless be displaced axially relative to this cylinder, as can be seen by comparing the positions in FIGS. 1 and 2. A helical spring 44 which bears against the wheel 32 on the one hand and against the upper ring 36 of the ratchet system 34 on the other hand is situated in the recessed part of the operating wheel 32. The action of the spring 44 consequently contributes towards holding the crown gears in mutual engagement, as shown in FIG. 1, which means that, given the orientation of the teeth, the operating wheel 32 may not be turned in a clockwise direction corresponding to the opening of the valve. In order to open the valve, the operating wheel 32 must be pushed down, as shown in FIG. 2, counter to the action of the spring 44 in order to deactivate the ratchet system 34 and to free the two crown gears. In this position, the wheel 32 may be turned both in the opening and in the closing direction.

Although the ratchet system with two complementary crown gears is preferred, it should be noted that the system also functions if one of the two crown gears has only a single tooth.

We claim:

1. A valve for a cylinder of compressed or liquefied gas, said valve comprising a body having a gas inlet duct and a gas outlet duct, a valve element selectively movable between open and closed positions relative to one of said ducts, a threaded cylinder screwed in said body and operable when rotated to move said valve element axially between said positions, a hand-actuated operating wheel connected rigidly to said threaded cylinder for rotating the threaded cylinder, a first annular ratchet element fixed rigidly to said body and held against movement relative to said body, a second annular ratchet element fixed rigidly to said operating wheel, said operating wheel and said second ratchet element being supported to move axially relative to said body, and spring means biasing said operating wheel axially away from said valve element and to a position placing said second ratchet element in engagement with said first ratchet element thereby to prevent rotation of aid operating wheel in one direction and to permit rotation of said operating wheel in the opposite direction said operating wheel being movable axially relative to said body and toward said valve element in opposition to said spring means to release said second ratchet element from said first ratchet element and permit rotation of said operating wheel in either direction said second ratchet element being releasable from said first ratchet element solely by axial movement of said operating wheel 2. Valve according to claim 1, characterized in that the two ratchet elements are two superposed rings (36, 40) with adjacent and complementary sawtooth crown gears.

3. Valve according to claim 2, characterized in that the said spring means consist of a helical spring (44) bearing on the one hand against the fixed crown gear (36) and on the other hand against the operating wheel (32) and whose action tends to hold the crown gears interconnected.

* * * * *